United States Patent
Yamada et al.

(10) Patent No.: US 10,284,349 B2
(45) Date of Patent: May 7, 2019

(54) TERMINAL APPARATUS, BASE STATION APPARATUS, AND INTEGRATED CIRCUIT

(71) Applicant: Sharp Kabushiki Kaisha, Sakai-shi, Osaka (JP)

(72) Inventors: Ryota Yamada, Sakai (JP); Kozue Yokomakura, Sakai (JP); Katsuya Kato, Sakai (JP); Hiromichi Tomeba, Sakai (JP); Kazunari Yokomakura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 84 days.

(21) Appl. No.: 15/117,775

(22) PCT Filed: Jan. 20, 2015

(86) PCT No.: PCT/JP2015/051400
§ 371 (c)(1),
(2) Date: Aug. 10, 2016

(87) PCT Pub. No.: WO2015/141266
PCT Pub. Date: Sep. 24, 2015

(65) Prior Publication Data
US 2016/0359578 A1    Dec. 8, 2016

(30) Foreign Application Priority Data

Mar. 20, 2014    (JP) .................................. 2014-057343

(51) Int. Cl.
H04W 4/00    (2018.01)
H04L 5/00    (2006.01)
(Continued)

(52) U.S. Cl.
CPC .......... *H04L 5/0053* (2013.01); *H04J 11/005* (2013.01); *H04W 72/0406* (2013.01); *H04W 72/082* (2013.01)

(58) Field of Classification Search
CPC .... H04J 11/005; H04L 5/0053; H04L 1/0026; H04L 1/0073; H04W 72/0406;
(Continued)

(56) References Cited

U.S. PATENT DOCUMENTS

| | | | | |
|---|---|---|---|---|
| 8,964,585 B2* | 2/2015 | Jung | ...................... | H04W 24/10 370/252 |
| 2009/0168704 A1* | 7/2009 | Lee | ................... | H04W 72/1278 370/329 |

(Continued)

OTHER PUBLICATIONS

3GPPTSG-RAN WGl #76; RI-140249;Prague, Czech Republic, Feb. 10-14, 2014 Title: Discussion on the feasibility of network coordination and performance impact Source: MediaTek Inc.*

(Continued)

*Primary Examiner* — Raj Jain
(74) *Attorney, Agent, or Firm* — Keating & Bennett, LLP

(57) ABSTRACT

Degradation in reception performance due to interference is reduced while suppressing control information from increasing. A higher layer that determines whether or not to apply NAICS and a reception unit that receives Downlink Control Information are included. In a case where, with the higher layer, an indication that the NAICS has to be applied is provided, if a first downlink control information format is received, signal detection in compliance with the NAICS is performed, and, in the case where, with the higher layer, the indication that the NAICS has to be applied is provided, if a second downlink control information format is received, signal detection in compliance with a linear scheme is performed. The first downlink control information format is (Continued)

constituted as at least one downlink control information format that is allocated only to a UE-specific search space.

8 Claims, 4 Drawing Sheets

(51) Int. Cl.
*H04W 72/04* (2009.01)
*H04W 72/08* (2009.01)
*H04J 11/00* (2006.01)

(58) Field of Classification Search
CPC ........... H04W 72/082; H04W 72/1289; H04W 88/06; H04W 92/18
See application file for complete search history.

(56) References Cited

U.S. PATENT DOCUMENTS

| | | | | |
|---|---|---|---|---|
| 2012/0327884 A1* | 12/2012 | Seo | ....................... | H04L 5/0057 370/329 |
| 2013/0294398 A1* | 11/2013 | Tujkovic | .............. | H04J 11/0053 370/330 |
| 2014/0044091 A1* | 2/2014 | Kishiyama | ............ | H04L 5/0014 370/330 |
| 2014/0119339 A1* | 5/2014 | Yang | ....................... | H04L 5/001 370/331 |
| 2014/0153488 A1* | 6/2014 | Koivisto | .................. | H04B 1/10 370/328 |
| 2014/0204857 A1* | 7/2014 | Mallik | .................. | H04L 1/0009 370/329 |
| 2014/0293890 A1* | 10/2014 | Davydov | .............. | H04L 5/0085 370/329 |
| 2015/0009964 A1* | 1/2015 | Ellenbeck | ............. | H04W 48/16 370/336 |
| 2015/0189630 A1* | 7/2015 | Aiba | .................... | H04W 72/042 370/329 |
| 2015/0326290 A1* | 11/2015 | Harrison | ............... | H04B 7/0456 375/260 |
| 2016/0044686 A1* | 2/2016 | Lindoff | ............. | H04W 72/0406 370/329 |
| 2016/0183289 A1* | 6/2016 | Qiang | ............... | H04W 72/1273 370/280 |
| 2016/0226534 A1* | 8/2016 | Suzuki | ................. | H04J 11/0053 |
| 2016/0323912 A1* | 11/2016 | Nakamura | ............ | H04L 1/0026 |
| 2016/0359578 A1* | 12/2016 | Yamada | ............ | H04W 72/0406 |
| 2017/0005743 A1* | 1/2017 | Lindoff | .................. | H04J 11/005 |
| 2017/0071005 A1* | 3/2017 | Kato | ....................... | H04B 1/707 |

OTHER PUBLICATIONS

Official Communication issued in International Patent Application No. PCT/JP2015/051400, dated Mar. 17, 2015.

MediaTek et al., "Study on Network-Assisted Interference Cancellation and Suppression for LTE", 3GPP TSG RAN Meeting #59, RP-130404, Feb. 26-Mar. 1, 2013, 7 pages.

LG Electronics, "Discussion on broadcasting dynamic network assistance information", 3GPP TSG RAN WG1 Meeting #76, R1-140341, Feb. 10-14, 2014, 6 pages.

Huawei et al., "Discussion on network coordination/signaling and specification impact for advanced receivers", 3GPP TSG RAN WG1 Meeting #75, R1-135017, Nov. 11-15, 2013, 6 pages.

MediaTek, Inc.; "Discussion on the Feasibility of Network Coordination and Performance Impact" 3GPP TSG-RAN WG1 #76; R1-140249; Feb. 10-14, 2014; 6 pages.

* cited by examiner

TERMINAL APPARATUS, BASE STATION APPARATUS, AND INTEGRATED CIRCUIT

TECHNICAL FIELD

The present invention relates to a terminal apparatus, a base station apparatus, and an integrated circuit.

BACKGROUND ART

In recent years, with the spread of smartphones or tablets, the amount of traffic in mobile transfer has continued to increase exponentially, and, is expected to increase into the future as well. As one solution to deal with such an increase in radio traffic, a study on a high-density arrangement of base stations on a Heterogeneous Network has been conducted. In the high-density arrangement of the base stations, low power base stations (Low Power Nodes (LPNs)) are arranged within a micro cell, a terminal apparatus makes a connection to the low power base station, and thus the load on a micro cell base station is reduced. At this time, a problem of Inter-Cell Interference occurs.

Furthermore, in order to improve cell throughput, a study on Multi-User Multiple Input Multiple Output (MU-MIMO) with which multiple terminal apparatuses are spatially multiplexed has been conducted as well. In the MU-MIMO, inter-apparatus interference (the inter-user interference) is a problem.

To deal with the inter-cell interference or the inter-user interference, a study on a Network Assisted Interference Cancellation and Suppression (NAICS) in which the terminal apparatus cancels or suppresses an interference signal has been conducted in 3rd Generation Partnership Project (3GPP). With the NAICS, the terminal apparatus receives a parameter relating to a different terminal apparatus that causes the interference, detects a signal that is destined for the different terminal apparatus that causes the interference, using the parameter, and removes an interference signal. By doing this, the terminal apparatus obtains a desired signal that is destined for the terminal apparatus itself. The NAICS is disclosed in NPL 1.

CITATION LIST

Non Patent Literature

NPL 1: RP-130404, "Study on Network-Assisted Interference Cancellation and Suppression for LTE," 3GPP TSG RAN Meeting #59, Mar. 3, 2013

SUMMARY OF INVENTION

Technical Problem

In the NAICS, in order to efficiently perform cancellation or suppression of an interference signal, it is desirable that the terminal apparatus knows whether or not to need the cancellation of the interference signal or the suppression of the interference signal. However, transmission from the base station apparatus to the terminal apparatus of a signal indicating whether or not to need the cancellation or the suppression of the interference signal increases the amount of control information, thereby decreasing efficiency and degrading throughput.

An object of the present invention, which was made in view of this situation, is to provide a terminal apparatus, a base station apparatus, and an integrated circuit, which are capable of reducing a degradation in reception performance due to interference while suppressing the amount of control information from increasing.

Solution to Problem

In order to deal with the problems described above, constitutions of a terminal apparatus, a base station apparatus, and an integrated circuit according to the present invention are as follows.

According to an aspect of the present invention, there is provided a terminal apparatus according to the present invention, including a higher layer that determines whether or not to apply NAICS; and a reception unit that receives Downlink Control Information, in which, in a case where, with the higher layer, an indication that the NAICS has to be applied is provided, if a first downlink control information format is received, signal detection in compliance with the NAICS is performed, and in the case where, with the higher layer, the indication that the NAICS has to be applied is provided, if a second downlink control information format is received, signal detection in compliance with a linear scheme is performed.

In the terminal apparatus according to the present invention, the first downlink control information format is constituted as at least one downlink control information format that is allocated only to a UE-specific search space.

In the terminal apparatus according to the present invention, the first downlink control information format is constituted as at least one downlink control information format associated with a transmission mode in compliance with a multi-antenna scheme.

In the terminal apparatus according to the present invention, the first downlink control information format is constituted as at least one downlink control information format associated with a transmission mode in compliance with a scheme that uses a terminal apparatus-specific Reference Signal for demodulation.

In the terminal apparatus according to the present invention, information indicating the first downlink control information format is signaled with a higher layer signal from a base station apparatus.

According to another aspect of the present invention, there is provided a base station apparatus including: a higher layer that determines whether or not to apply NAICS to a terminal apparatus; and a transmission unit that transmits information indicating a first downlink control information format which indicates that the terminal apparatus is instructed to perform signal detection in compliance with the NAICS, to the terminal apparatus with a higher layer signal, in a case where it is determined that the NAICS is applied with the higher layer.

According to still another aspect of the present invention, there is provided a base station apparatus including: a higher layer that determines whether or not to apply NAICS to a terminal apparatus; and a transmission unit that transmits information indicating a second downlink control information format which indicates that the terminal apparatus is instructed not to perform signal detection in compliance with the NAICS, to the terminal apparatus with a higher layer signal, in a case where it is determined that the NAICS is applied with the higher layer.

According to still another aspect of the present invention, there is provided an integrated circuit that is built into a terminal apparatus, including means that determines whether or not to apply NAICS; and means that receives Downlink Control Information, in which, in a case where, with the higher layer, an indication that the NAICS has to be applied is provided, if first downlink control information format is received, signal detection in compliance with the NAICS is performed, and in which, in the case where, with the higher layer, the indication that the NAICS has to be applied is provided, if second downlink control information format is received, signal detection in compliance with a linear scheme is performed.

Advantageous Effects of Invention

According to the present invention, a terminal apparatus can determine whether or not to cancel/suppress interference without increasing the amount of control information for canceling/suppressing an interference signal. Therefore, the terminal apparatus can reduce degradation in reception performance due to the interference in an efficient manner.

DESCRIPTION OF EMBODIMENTS

A communication system according to the present invention includes a base station apparatus (a transmission apparatus, a cell, a transmission point, a transmit antenna group, a transmit antenna port group, a component carrier, or an eNodeB) and a terminal apparatus (a terminal, a mobile terminal, a reception point, a reception terminal, a reception apparatus, a receive antenna group, a receive antenna port group or a UE).

According to the present embodiment, "X/Y" includes the meaning of "X or Y". According to the present embodiment, "X/Y" includes the meaning of "X and Y". According to the present embodiment, "X/Y" includes the meaning of "X and/or Y".

Figure 1:
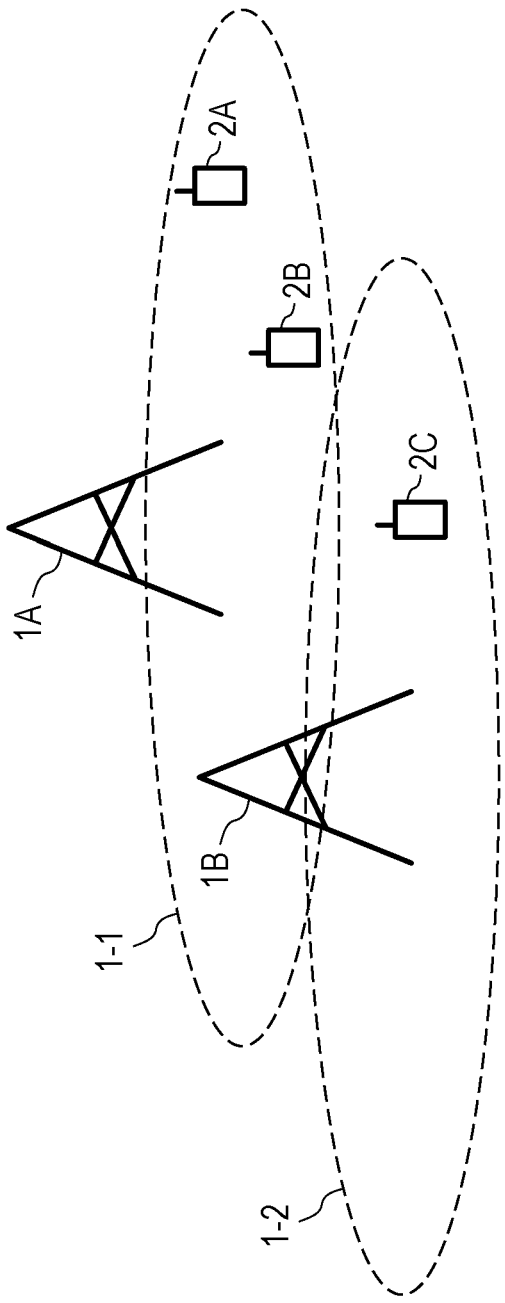
FIG. 1 is a diagram illustrating an example of a communication system according to the present embodiment.

FIG. 1 is a diagram illustrating one example of the communication system according to the present embodiment. As illustrated in FIG. 1, the communication system according to the present invention includes a base station apparatuses 1A and 1B and terminal apparatuses 2A, 2B, and 2C. Furthermore, coverage 1-1 is a range (a communication area) in which it is possible that the base station apparatus 1A connects to the terminal apparatus. Furthermore, coverage 1-2 is a range (a communication area) in which it is possible that the base station apparatus 1B to connect to the terminal apparatus. The terminal apparatuses 2A and 2B will also be described as a terminal apparatus 2.

In FIG. 1, in a case where the base station apparatus 1A spatially multiplexes the terminal apparatus 2A and the terminal apparatus 2B, or in a case where the terminal apparatus 2 suffers inter-cell interference from the base station apparatus 1B, reception signals in the terminal apparatus 2 include a desired signal that is destined for the terminal apparatus 2 itself (which is also referred to as a first terminal apparatus) and a signal that is desired for a terminal apparatus (which is referred to as a second terminal apparatus) that causes interference. Specifically, the reception signals in the terminal apparatus 2A includes a desired signal that is destined for the terminal apparatus 2A itself, a signal that is destined for the terminal apparatus 2B, and an interference signal that is a signal that is destined for the terminal apparatus 2C. The desired signal and the signal are transmitted from the base station apparatus 1A, and the interference signal is transmitted from the base station apparatus 1B. Furthermore, the reception signals in the terminal apparatus 2B includes a desired signal that is destined for the terminal apparatus 2B itself, which is transmitted from the base station apparatus 1A, a signal that is destined for the terminal apparatus 2A, and an interference signal that is a signal that is destined for the terminal apparatus 2C, which is transmitted from the base station apparatus 1B.

In this manner, according to the present embodiment, a case where the base station apparatus spatially multiplexes multiple terminals and thus the terminal apparatus receives the inter-user interference or receives inter-cell interference from a different base station apparatus may be possible, and no limitation to the communication system in FIG. 1 is imposed. Furthermore, the inter-user interference and the inter-cell interference do not necessarily need to be received at the same time, any of the case of receiving only the inter-user interference and the case of receiving only the inter-cell interference is included in the present invention.

In FIG. 1, in uplink wireless communication from the terminal apparatus 2 to the base station apparatus 1A, the following uplink physical channels are used. The uplink physical channels are used for transmitting information that is output from a higher layer.

Physical Uplink Control Channel (PUCCH)
Physical Uplink Shared Channel (PUSCH)
Physical Random Access Channel (PRACH)

The PUCCH is used for transmitting Uplink Control Information (UCI). At this point, the Uplink Control Information includes a positive acknowledgement (ACK) or a negative acknowledgement (NACK) (ACK/NACK) of downlink data (a downlink Transport Block or a Downlink-Shared Channel (DL-SCH)). The ACK/NACK of the downlink data is also referred to as an HARQ-ACK or HARQ feedback.

Furthermore, the Uplink Control Information includes a Channel State Information (CSI) for downlink. Furthermore, the Uplink Control Information includes a Scheduling Request (SR) that is used for making a request for a resource for an Uplink-Shared Channel (UL-SCH).

The PUSCH is used for transmitting uplink data (an uplink Transport Block or the UL-SCH). Furthermore, the PUSCH may be used for transmitting the ACK/NACK and/or the Channel State Information, along with the uplink data. Furthermore, the PUSCH may be used for transmitting only the Uplink Control Information.

Furthermore, the PUSCH is used for transmitting an RRC message. The RRC message is a piece of information/signal that is processed in a Radio Resource Control (RRC). Furthermore, the PUSCH is used for transmitting an MAC control element (CE). At this point, the MAC CE is a piece of information/signal that is processed (transmitted) in a Medium Access Control (MAC) layer.

For example, a power headroom may be included in the MAC CE and may be reported through the PUSCH. That is, an MAC CE field may be used for indicating a power headroom level.

The PRACH is used for transmitting a random access preamble.

Furthermore, in the uplink wireless communication, an Uplink Reference Signal (UL RS) is used as an uplink physical signal. The uplink physical signal is not used for transmitting the information that is output from the higher layer, but is used by a physical layer. At this point, a Demodulation Reference Signal (DMRS) and a Sounding Reference Signal (SRS) are included in the uplink reference signal.

The DMRS is associated with transmission of the PUSCH or the PUCCH. For example, the base station apparatus 1A uses the DMRS to perform channel reconfiguration of the PUSCH or the PUCCH. The SRS is not associated with the transmission of the PUSCH or the PUCCH. For example, the base station apparatus 1A uses the SRS to measure an uplink channel state.

In FIG. 1, in downlink wireless communication from the base station apparatus 1A to the terminal apparatus 2, the following downlink physical channels are used. The downlink physical channels are used for transmitting the information that is output from the higher layer.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)

The PBCH is used for broadcasting a Master Information Block (MIB) (Broadcast Channel (BCH)) that is used in a shared manner in the terminal apparatus 2. The PCFICH is used for transmitting information indicating a region (for example, the number of OFDM symbols) that is used for transmission of the PDCCH.

The PHICH is used for transmitting the ACK/NACK of the uplink data that is received by the base station apparatus 1A. That is, the PHICH is used for transmitting an HARQ indicator (HARQ feedback) indicating the ACK/NACK of the uplink data.

The PDCCH and the EPDCCH are used for transmitting Downlink Control Information (DCI). At this point, multiple DCI formats are defined for transmission of the Downlink Control Information. That is, a field for the Downlink Control Information is defined in a DCI format and is mapped to an information bit.

For example, DCI format 1A that is used for scheduling of one PDSCH (transmission of one downlink Transport Block) in one cell is defined as a DCI format for the downlink.

For example, information relating to PDSCH resource allocation, information relating to a Modulation and Coding Scheme (MCS) for the PDSCH, and the Downlink Control Information such as a TPC command for the PUCCH are included in the DCI format for the downlink. At this point, the DCI format for the downlink is also referred to as a downlink grant (or a downlink assignment).

Furthermore, for example, DCI format 0 that is used for scheduling of one PUSCH (transmission of one uplink Transport Block) in one cell is defined as a DCI format for uplink.

For example, information relating to PUSCH resource allocation, information relating to the MCS for the PUSCH, Uplink Control Information such as a TPC command for the PUSCH are included in the DCI format for the uplink. The DCI format for the uplink is also referred to as an uplink grant (or an uplink assignment).

In a case where a PDSCH resource is scheduled using the downlink assignment, the terminal apparatus 2 receives the downlink data, on the scheduled PDSCH. Further, in a case where a PUSCH resource is scheduled using the uplink grant, the terminal apparatus 2 transmits the uplink data and/or the Uplink Control Information, on the scheduled PUSCH.

The PDSCH is used for transmitting the downlink data (the downlink Transport Block or the DL-SCH). Furthermore, the PDSCH is used for transmitting a system information block type-1 message. The system information block type-1 message is cell-specific (cell-peculiar) information.

Furthermore, the PDSCH is used for transmitting a system information message. The system information message includes a system information block X other than the system information block type-1. The system information message is cell-specific (cell-peculiar) information.

Furthermore, the PDSCH is used for transmitting the RRC message. At this point, the RRC message that is transmitted from the base station apparatus 1A may be common to multiple terminal apparatuses 2 within a cell. Furthermore, the RRC message that is transmitted from the base station apparatus 1A may be a message (which is also referred to as dedicated signaling) dedicated to a certain terminal apparatus 2. That is, user equipment-specific (user equipment-peculiar) information is transmitted using a message dedicated to a certain terminal apparatus 2. Furthermore, the PDSCH is used for transmitting the MAC CE.

At this point, the RRC message and/or the MAC CE are also referred to as higher layer signaling.

Furthermore, in the downlink wireless communication, a Synchronization signal (SS) and a Downlink Reference Signal (DL RS) are used as Downlink Reference Signals. The uplink physical signal is not used for transmitting the information that is output from the higher layer, but is used by the physical layer.

The Synchronization Signal is used for the terminal apparatus 2 to be synchronized to a frequency domain for and a time domain for downlink. Furthermore, the Downlink Reference Signal is used for the terminal apparatus 2 to perform the channel reconfiguration of the downlink physical channel. For example, the Downlink Reference Signal is used for the terminal apparatus 2 to calculate the Channel State Information for the downlink.

At this point, a Cell-specific Reference Signal (CRS), a UE-specific Reference Signal (URS) associated with the PDSCH, a Demodulation Reference Signal (DMRS) associated with the EPDCCH, a Non-Zero Power Channel State Information-Reference Signal (NZ PCSI-RS), and a Zero Power Chanel State Information-Reference Signal (ZP CSI-RS) are included in the Downlink Reference Signal.

The CRS is transmitted in all bands for a subframe, and is used to perform demodulation of the PBCH/PDCCH/PHICH/PCFICH/PDSCH. The URS associated with the PDSCH is transmitted on and in a subframe and a band that are used for transmission of the PDSCH with which the URS is associated, and is used for performing the demodulation of the PDSCH with which the URS is associated.

The DMRS associated with the EPDCCH is transmitted on and in a subframe and a band that are used for transmission of the EPDCCH with which the DMRS is associated. The DMRS is used for performing demodulation of the EPDCCH with which the DMRS is associated.

A resource for the NZP CSI-RS is configured by the base station apparatus 1A. For example, the terminal apparatus 2 performs signal measurement (channel measurement) using the NZP CSI-RS. A resource for the ZP CSI-RS is configured by the base station apparatus 1A. With a zero output, the base station apparatus 1A transmits the ZP CSI-RS. For example, the terminal apparatus 2 performs interference measurement on a resource to which the NZP CSI-RS corresponds.

At this point, the downlink physical channel and the downlink physical signal are also collectively referred to as a downlink signal. Furthermore, the uplink physical channel and the uplink physical signal are also collectively referred to as an uplink signal. Furthermore, the downlink physical channel and the uplink physical channel are also collectively referred to as a physical channel. Furthermore, the downlink physical signal and the uplink physical signal are also collectively referred to as a physical signal.

Furthermore, a BCH, a UL-SCH and a DL-SCH are transport channels. A channel that is used in an MAC layer is referred to as a transport channel. Furthermore, a unit of the transport channel that is used in the MAC layer is also referred to as a Transport Block (TB) or an MAC Protocol Data Unit (PDU). The Transport Block is a unit in which the MAC layer delivers data to the physical layer. In the physical layer, the Transport Block is mapped to a codeword, and coding processing and the like are performed on every codeword.

Figure 2:
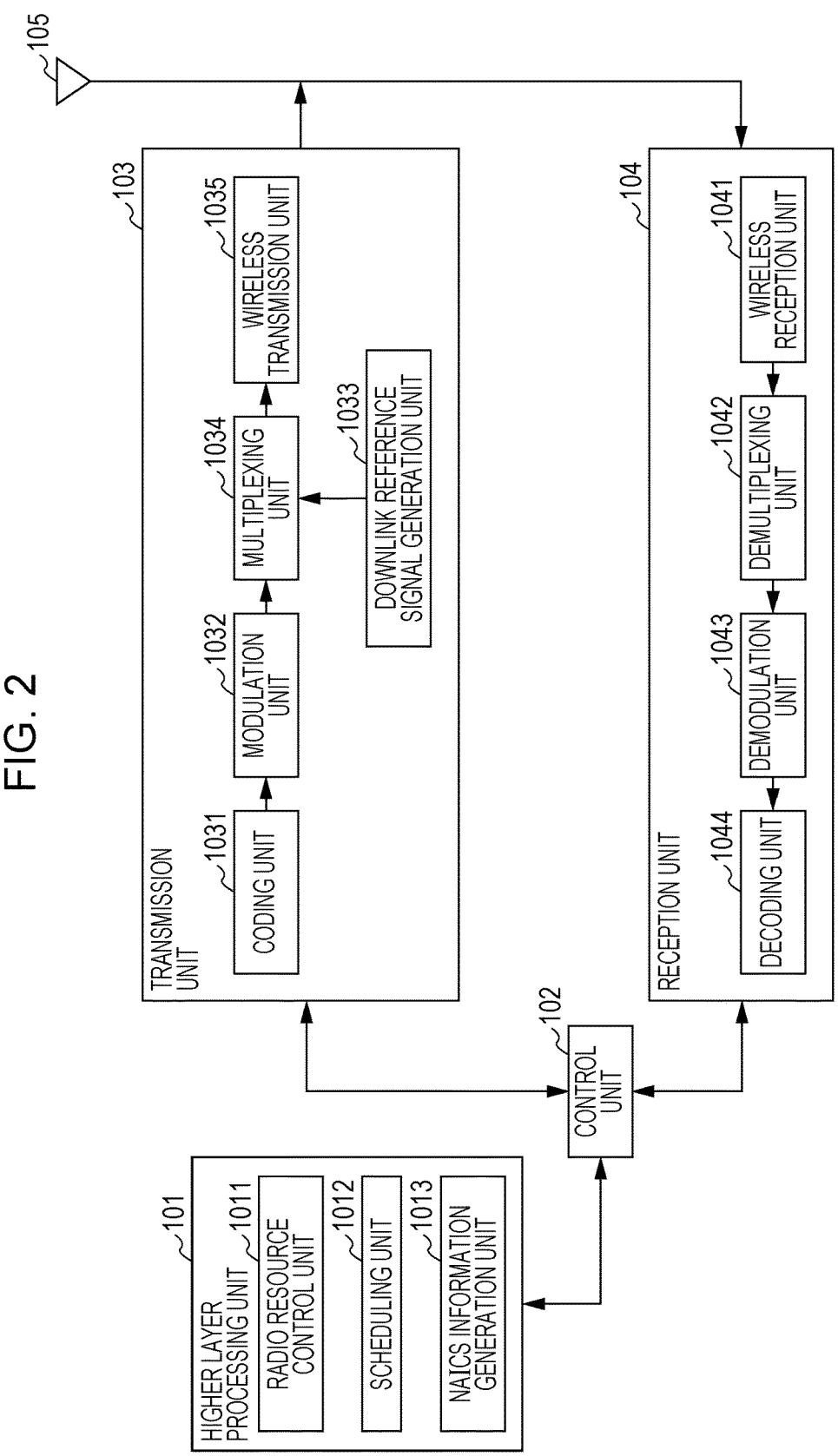
FIG. 2 is a block diagram illustrating an example of a constitution of a base station apparatus according to the present embodiment.

FIG. 2 is a schematic block diagram illustrating a constitution of the base station apparatus 1A according to the present invention. As illustrated in FIG. 2, the base station apparatus 1A is constituted to include a higher layer processing unit 101, a control unit 102, a transmission unit 103, a reception unit 104, and a transmit and receive antenna 105. Furthermore, the higher layer processing unit 101 is constituted to include a radio resource control unit 1011, a scheduling unit 1012, and a NAICS information generation unit 1013. Furthermore, the transmission unit 103 is constituted to include a coding unit 1031, a modulation unit 1032, a downlink reference signal generation unit 1033, a multiplexing unit 1034, and a wireless transmission unit 1035. Furthermore, the reception unit 104 is constituted from a wireless reception unit 1041, a demultiplexing unit 1042, a demodulation unit 1043, and a decoding unit 1044.

The higher layer processing unit 101 performs processing of the Medium Access Control (MAC) layer, a Packet Data Convergence Protocol (PDCP) layer, a Radio Link Control (RLC) layer, and the Radio Resource Control (RRC) layer. Furthermore, the higher layer processing unit 101 generates information indispensable to perform control of the transmission unit 103 and the reception unit 104, and outputs the generated information to the control unit 102.

The radio resource control unit 1011 generates or acquires from a higher node the downlink data (the Transport Block) that is mapped to the PDSCH for the downlink, the system information, the RRC message, the MAC CE, and the like. The radio resource control unit 1011 outputs the downlink data to the transmission unit 103, and outputs other pieces of information to the control unit 102. Furthermore, the radio resource control unit 1011 manages various pieces of configuration information of the terminal apparatus 2. This configuration information can include configuration information of the terminal apparatus that causes the interference. Alternatively, the configuration information of the terminal apparatus that causes the interference can be made to be acquired from the configuration information of the terminal apparatus 2 itself.

The scheduling unit 1012 determines a frequency and a subframe to which the physical channels (the PDSCH and PUSCH) are allocated, a coding rate and a modulation scheme (or the MCS) of and for the physical channel (the PDSCH and the PUSCH), transmit power, and the like. The scheduling unit 1012 outputs pieces of information that are determined, to the control unit 102.

The scheduling unit 1012 generates information that is used for scheduling of the physical channels (the PDSCH and the PUSCH), based on a result of the scheduling. The scheduling unit 1012 outputs the generated information to the control unit 102. According to the present embodiment, as one example, the scheduling unit 1012 schedules the terminal apparatus 2A and the terminal apparatus 2B to use the same resource. Moreover, according to the present embodiment, for simplicity, it is assumed that the same resource is used, but on the condition that the terminal apparatus 2A can acquire resources that are allocated to the terminal apparatus 2B, the scheduling may be performed for the use of different resources. Moreover, the scheduling can be performed in cooperation with the base station apparatus 1B.

The NAICS information generation unit 1013 generates NAICS information and outputs the generated NAICS to the control unit 102. The NAICS information is information that indicates whether the base station apparatus 1A instructs the terminal apparatus 2 to perform cancellation/suppression of the interference signal using NAICS.

Furthermore, the NAICS information is not limited to a case where a NAICS scheme is used, and application thereof is possible in any case where a scheme of canceling or suppressing the interference signal is used.

Based on information that is input from the higher layer processing unit 101, the control unit 102 generates a control signal for performing control of the transmission unit 103 and the reception unit 104. Based on the information that is input from the higher layer processing unit 101, the control unit 102 generates the Downlink Control Information, and outputs the generated Downlink Control Information to the transmission unit 103.

The inter-cell interference and the inter-user interference changes remarkably by allocation of a resource to the terminal apparatus. In a case where the interference signal is weak, the cancellation/suppression of the interference signal is not needed. Furthermore, in a case where strong interference signal than is assumed occurs, although the cancellation/suppression of the interference signal is performed, there is a likelihood that an effect will not be obtained. In a case where the effect is not obtained, the performing of the cancellation/suppression of the interference signal is not desirable because this increases power consumption by the terminal apparatus. Therefore, there is a need to indicate the cancellation/suppression of the interference signal according to an interference situation and to suitably perform the cancellation/suppression of the interference signal.

However, because the NAICS information is a higher layer signal and it takes time to reflect a configuration in the higher layer signal, in a case where the interference situation changes abruptly, there is a likelihood that this will not be dealt with.

Accordingly, in a case where the NAICS information indicates that the NAICS has to be applied, the control unit 102, if the terminal apparatus 2 is instructed to perform the cancellation/suppression of the interference signal, the control unit 102 controls the transmission unit 103 in such a manner that the Downlink Control Information is transmitted using a first downlink control information format. In the case where the NAICS information indicates that the NAICS has to be applied, the control unit 102, if the terminal apparatus 2 is not instructed to perform the cancellation/suppression of the interference signal, the control unit 102 controls the transmission unit 103 in such a manner that the Downlink Control Information is transmitted using a second downlink control information format.

At this time, if the terminal apparatus 2 understand which one of the first downlink control information format and the second downlink control information format is used to transmit the Downlink Control Information, although signaling indicating whether or not the cancellation/suppression of the interference signal is performed with the physical layer is not present, the terminal apparatus 2 can make a determination.

For example, the first downlink control information format can be set to be a downlink control information format that is allocated only to UE-specific search space, and the second downlink control information format can be set to be at least one downlink control information format that is different form the first downlink control information format. For example, the second downlink control information format can be set to be DCI format 1A/1C. The downlink control information formats that are allocated only to the UE-specific search space is DCI formats 1, 1B, 1D, 2, 2A, 2B, 2C, and 2D. Moreover, at least one of DCI formats 1, 1B, 1D, 2, 2A, 2B, 2C, and 2D may be set to be the first downlink control information format, and all downlink control information formats that are allocated only to the UE-specific search space may not be included in the first downlink control information format.

For example, the first downlink control information format can be set to be the downlink control information format associated with a transmission mode in compliance with a multi-antenna scheme, and the second downlink control information format can be set to be at least one downlink control information format that is different from the first downlink control information format. The downlink control information formats associated with the transmission mode in compliance with the multi-antenna scheme are DCI formats 1, 1D, 2, 2A, 2B, 2C, and 2D. Moreover, at least one of DCI formats 1, 1D, 2, 2A, 2B, 2C, and 2D may be set to be the first downlink control information format, all formats associated with the downlink control information format associated with the transmission mode in compliance with the multi-antenna scheme may not be included in the first downlink control information format.

For example, the first downlink control information format can be set to be the downlink control information format associated with transmission mode 9/10, and the second downlink control information format can be set to be at least one downlink control information format that is different from the first downlink control information format. The downlink control information formats associated with the transmission mode 9/10 are DCI formats 2C and 2D. Moreover, at least one of DCI formats 2C and 2D may be included in the first downlink control information format.

For example, the second downlink control information format is at least one of DCI formats 1A and 1C, and the first downlink information format can be set to be a downlink control information format other than the second downlink control information format.

The first downlink control information format/second downlink control information format can be configured in advance, and can be signaled with the higher layer signal from the base station apparatus to the terminal apparatus.

The transmission unit 103 generates the Downlink Reference Signal in accordance with the control signal that is input from the control unit 102, codes and modulates the HARQ indicator, the Downlink Control Information, and the downlink data that are input from the higher layer processing unit 101, multiplexes the PHICH, the PDCCH, the EPDCCH, the PDSCH, and the Downlink Reference Signal, and transmits the resulting signal to the terminal apparatus 2 through the transmit and receive antenna unit 105.

The coding unit 1031 performs coding on the HARQ indicator, the Downlink Control Information, and the downlink data that are input from the higher layer processing unit 101. When performing the coding, the coding unit 1031 uses a coding scheme that is prescribed in advance, such as a block coding, convolutional coding, or turbo coding, or uses a coding scheme that is determined by the radio resource control unit 1011. The modulation unit 1032 performs modulation on coded bits that are input from the coding unit 1031, using a modulation scheme that is prescribed in advance, such as Binary Phase Shift Keying (BPSK), quadrature Phase Shift Keying (QPSK), 16 quadrature amplitude modulation (QAM), 64 QAM, or 256 QAM, or using a modulation scheme that is determined by the radio resource control unit 1011.

The downlink reference signal generation unit 1033 generates as the Downlink Reference Signal a sequence that is already known to the terminal apparatus 2, which is obtained according to a rule that is prescribed in advance based on a physical cell identifier (PCI) for identifying the base station apparatus 1A, and the like.

The multiplexing unit 1034 multiplexes a modulation symbol of each channel, which results from the modulation, the generated Downlink Reference Signal, and the Downlink Control Information. More precisely, the multiplexing unit 1034 maps the modulation symbol of each channel, which results from the modulation, the generated Downlink Reference Signal, and the downlink control information to resource elements.

The wireless transmission unit 1035 performs Inverse Fast Fourier Transform (IFFT) on a modulation symbol and the like that result from the multiplexing, generates an OFDM symbol, attaches a cyclic prefix (CP) to the OFDM symbol, generates a digital signal in a baseband, converts the digital signal in the baseband into an analog signal, removes a superfluous frequency component by perform filtering, performs up-converting into a carrier frequency, performs power amplification, and outputs a final result to the transmit and receive antenna unit 105 for transmission.

In accordance with the control signal that is input from the control unit 102, the reception unit 104 outputs information, which results from demultiplexing, demodulating, and decoding a reception signal that is received from the terminal apparatus 2 through the transmit and receive antenna 105, to the higher layer processing unit 101.

The wireless reception unit 1041 converts an uplink signal that is received through the transmit and receive antenna 105, into a signal in a base band by performing downconvert, removes a unnecessary frequency component, controls an amplification level in such a manner that a signal level is suitably maintained, performs orthogonal demodulation based on an in-phase component and an orthogonal component of the received signal, and converts an analog signal that results from the orthogonal demodulation, into a digital signal.

The wireless reception unit 1041 removes a portion that is equivalent to the CP from the digital signal that results from the conversion. The wireless reception unit 1041 performs Fast Fourier Transform (FFT) on the signal from which the CP is removed, extracts a signal in the frequency domain, and outputs the extracted signal to the demultiplexing unit 1042.

The demultiplexing unit 1042 demultiplexes the signal that is input from the wireless reception unit 1041 into the PUCCH, the PUSCH, and the signal such as the Uplink Reference Signal. Moreover, the demultiplexing is performed based on radio resource allocation information that is determined in advance by the base station apparatus 1A, using the radio resource control unit 1011, and that is included in the uplink grant that is notified to each terminal apparatus 2.

Furthermore, the demultiplexing unit 1042 performs channel compensation on the PUCCH and the PUSCH. Furthermore, the demultiplexing unit 1042 demultiplexes the Uplink Reference Signal.

The demodulation unit 1043 performs Inverse Discrete Fourier Transform (IDFT) on the PUSCH, acquires the modulation symbol, and performs reception signal demodulation on each of the modulation symbols on the PUCCH and the PUSCH, using the modulation scheme that is prescribed in advance, such as BPSK, QPSK, 16 QAM, 64 QAM, or 256 QAM, or using the modulation scheme that is notified, in advance, with the uplink grant, to each terminal apparatus 2 by the base station apparatus 1A itself.

The decoding unit 1044 performs the decoding on coded bits of the PUCCH and the PUSCH that result from the demodulation, at a coding rate in compliance with the coding scheme that is prescribed in advance, which is prescribed in advance, or at a coding rate which is notified in advance with the uplink grant to the terminal apparatus 2 by the base station apparatus 1A itself, and outputs the uplink data and the Uplink Control Information that result from the decoding, to the higher layer processing unit 101. In the case of re-transmission of the PUSCH, the decoding unit 1044 performs the decoding using the coded bits that are input from the higher layer processing unit 101 and that are retained in an HARQ buffer, and the coded bits that result from the demodulation.

Figure 3:
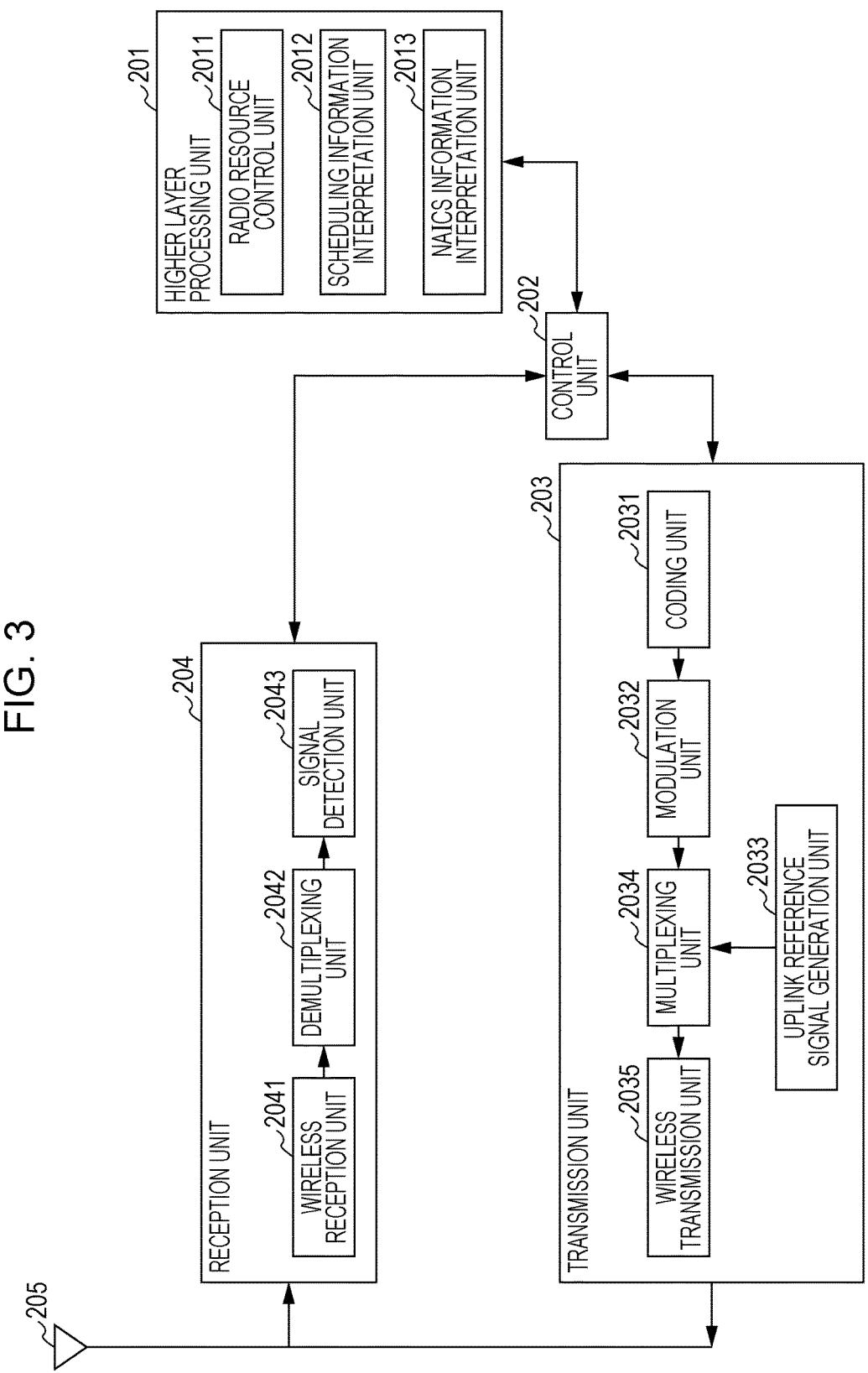
FIG. 3 is a block diagram illustrating an example of a constitution of a terminal apparatus according to the present embodiment.

FIG. 3 is a schematic block diagram illustrating a constitution of the terminal apparatus 2 according to the present invention. As illustrated in FIG. 3, the terminal apparatus 2 is constituted to include a higher layer processing unit 201, a control unit 202, a transmission unit 203, a reception unit 204, and a transmit and receive antenna 205. Furthermore, the higher layer processing unit 201 is constituted to include a radio resource control unit 2011, a scheduling information interpretation unit 2012, and a NAICS information interpretation unit 2013. Furthermore, the transmission unit 203 is constituted to include a coding unit 2031, a modulation unit 2032, an uplink reference signal generation unit 2033, a multiplexing unit 2034, and a wireless transmission unit 2035. Furthermore, the reception unit 204 is constituted to include a wireless reception unit 2041, a demultiplexing unit 2042, and a signal detection unit 2043.

The higher layer processing unit 201 outputs the uplink data (the Transport Block) that is generated by a user operation and the like, to the transmission unit 203. Furthermore, the higher layer processing unit 201 performs the processing of the Medium Access Control (MAC) layer, the Packet Data Convergence Protocol (PDCP) layer, the Radio Link Control (RLC) layer, and the Radio Resource Control (RRC) layer.

The radio resource control unit 2011 manages various pieces of configuration information of the terminal apparatus 2 itself. Furthermore, the radio resource control unit 2011 generates information that is mapped to each uplink channel in the uplink and outputs the generated information to the transmission unit 203.

The scheduling information interpretation unit 2012 interprets the Downlink Control Information that is received through the reception unit 204 and determines scheduling information. Furthermore, the scheduling information interpretation unit 2012 generates control information in order to perform control of the reception unit 204 and the transmission unit 203 based on the scheduling information, and outputs the generated control information to the control unit 202.

The NAICS information interpretation unit 2013 interprets the NAICS information that is received through the reception unit 204, and determines whether or not a NAICS indication is present. Furthermore, the NAICS information interpretation unit 2013 outputs a result of determining the NAICS information to the control unit 202. Moreover, the NAICS information interpretation unit 2013 may determine the result of determining the NAICS information, depending on a situation (a reception quality or the like) of the terminal apparatus 2.

Furthermore, the NAICS information interpretation unit 2013 generates terminal information and outputs the generated terminal information to the control unit 202. Moreover, the terminal information is information relating to a function that the terminal apparatus 2 has. For example, the terminal information may be information indicating whether or not the terminal apparatus 2 has a NAICS function, and, may be information that results from determining whether or not the NAICS is performed considering the reception quality or the like, regardless of whether or not the terminal apparatus 2 has the NAICS function.

Based on the information that is input from the higher layer processing unit 201, the control unit 202 generates a control signal for performing the control of the reception unit 204 and the transmission unit 203. The control unit 202 outputs the generated control signal to the reception unit 204 and the transmission unit 203 and performs the control of the reception unit 204 and the transmission unit 203. The control unit 202 outputs the result of determining the NAICS information to the reception unit 204 and outputs the Uplink Control Information that includes the terminal information and the like, and the uplink data, to the transmission unit 203.

The control unit 202 receives information indicating in which downlink control information format the Downlink Control Information is received, from the reception unit 204. In a case where the NAICS information indicates that the NAICS has to be applied, if the received downlink control information format is the first downlink control information format, the control unit 202 generates the control information in such a manner that the cancellation/suppression of the interference signal is performed in the reception unit 204. In the case where the NAICS information indicates that the NAICS has to be applied, if the downlink control information format is the second downlink control information format, the control information is generated in such a manner that interference suppression using a linear detection scheme is performed in the reception unit 204. For example, the second downlink control information format is DCI format 1A/1C.

The control unit 202 can signal a downlink control information format that is included in the first downlink control information format, with the higher layer signal from the base station apparatus, and can configure such a downlink control information format in advance. Furthermore, the control unit 202 can signal a downlink control information format that is included in the second downlink control information format, with the higher layer signal from the base station apparatus, and can configure such a downlink control information format in advance.

In accordance with a control signal that is input from the control unit 202, the reception unit 204 demultiplexes, demodulates, and decodes a reception signal that is received from the base station apparatus 1A through the transmit and receive antenna 205, and outputs the resulting information to the higher layer processing unit 201.

The wireless reception unit 2041 converts a downlink signal that is received through the transmit and receive antenna 205, into a signal in a base band by performing down-convert, removes a unnecessary frequency component, controls an amplification level in such a manner that a signal level is suitably maintained, performs orthogonal demodulation based on an in-phase component and an orthogonal component of the received signal, and converts an analog signal that results from the orthogonal demodulation, into a digital signal.

Furthermore, the wireless reception unit 2041 removes a portion that is equivalent to the CP from the digital signal that results from the conversion, performs Fast Fourier Transform on the signal from which the CP is removed, and extracts a signal in the frequency domain.

The demultiplexing unit 2042 demultiplexes a signal that results from the extraction, into the PHICH, the PDCCH, the EPDCCH, the PDSCH, and the Downlink Reference Signal. Furthermore, the demultiplexing unit 2042 performs channel compensation on the PHICH, the PDCCH, and the EPDCCH based on a channel estimate of a desired signal that is acquired from channel measurement, detects the Downlink Control Information, and outputs the detected Downlink Control Information to the control unit 202. Furthermore, the demultiplexing unit 2042 outputs information indicating which Downlink Control Information format is used to receive the Downlink Control Information, to the control unit 202. Furthermore, the control unit 202 outputs the PDSCH and the channel estimate of the desired signal to the signal detection unit 2043.

Furthermore, the demultiplexing unit 2042 performs the channel estimate of the interference signal. The demultiplexing unit 2042 outputs the channel estimate of the interference signal to the signal detection unit 2043.

The signal detection unit 2043 detects downlink data (a Transport Block) of a first reception signal using the PDSCH and the channel estimate, and outputs a result of the detection to the higher layer processing unit 201. In a case where the control information that is input from the control unit 202 indicates that the NAICS has to be applied, the signal detection unit 2043 performs the cancellation/suppression of the interference signal in compliance with the NAICS. Moreover, a method of canceling/suppressing the interference signal is linear detection, maximum likelihood estimation, interference canceler, or the like. The linear detection is Enhanced Linear Minimum Mean Square Error-Interference Rejection Combining (LMMSE-IRC), Widely Linear MMSE-IRC (WL MMSE-IRC), or the like. The maximum likelihood estimation is Maximum Likelihood (ML), Reduced complexity ML (R-ML), Iterative ML, Iterative R-ML, or the like. The interference canceler is Turbo Successive Interference Cancellation (SIC), Parallel Interference Cancellation (PIC), Linear Code Word level SIC (L-CWIC), ML Code Word level SIC (ML-CWIC), Symbol Level IC (SLIC), or the like.

In a case where the control information that is input from the control unit 202 does not indicate that the NAICS has to be applied, the signal detection unit 2043 performs the interference suppression in compliance with the linear scheme, without performing the interference cancellation/suppression in compliance with the NAICS. The interference suppression in compliance with the linear scheme is LMMSE-IRC, Enhanced LMMSE-IRC, or the like.

The transmission unit 203 generates the Uplink Reference Signal in accordance with the control signal, which is input from the control unit 202, performs the coding and the modulation on the uplink data (the Transport Block), which is input from the higher layer processing unit 201, multiplexes the PUCCH, the PUSCH, and the generated Uplink Reference Signal, and transmits a result of the multiplexing to the base station apparatus 1A through the transmit and receive antenna 205.

The coding unit 2031 performs the coding, such as the convolutional coding or the block coding, on the uplink control information that is input from the higher layer processing unit 201. Furthermore, the coding unit 2031 performs the turbo coding, based on information that is used for scheduling of the PUSCH.

The modulation unit 2032 performs the modulation on coded bits, which are input from the coding unit 2031, in compliance with a modulation scheme that is notified with the Downlink Control Information, such as BPSK, QPSK, 16 QAM, or 64 QAM, or in compliance with a modulation scheme that is prescribed in advance for every channel.

The uplink reference signal generation unit 2033 generates a sequence that is obtained according to a rule (formula) which is prescribed in advance, based on a physical cell identifier (also referred to as a physical cell identity (PCI) or a Cell ID) for identifying the base station apparatus 1A, a bandwidth to which the Uplink Reference Signal is mapped, a cyclic shift that is notified with the uplink grant, a parameter value for generation of a DMRS sequence, and the like.

In accordance with the control signal that is input from the control unit 202, the multiplexing unit 2034 re-maps the modulation symbols on the PUSCH in parallel and then performs Discrete Fourier Transform (DFT) on the re-mapped modulation symbols. Furthermore, the multiplexing unit 2034 multiplexes PUCCH and PUSCH signals and the generated Uplink Reference Signal for every transmit antenna port. More precisely, the multiplexing unit 2034 maps the PUCCH and PUSCH signals and the generated Uplink Reference Signal to resource elements for every transmit antenna port.

The wireless transmission unit 2035 performs inverse Fast Fourier Transform on the modulation symbol that results from the multiplexing, performs modulation in compliance with an SC-FDMA scheme, generates an SC-FDMA symbol, attaches a CP to the generated SC-FDMA symbol, generates a digital signal in a base band, converts the digital signal in the base band into an analog signal, performs up-convert into a signal at a carrier frequency, removes superfluous frequency components, performs power amplification, and transmits a final result to the transmit and receive antenna 205 for transmission.

Figure 4:
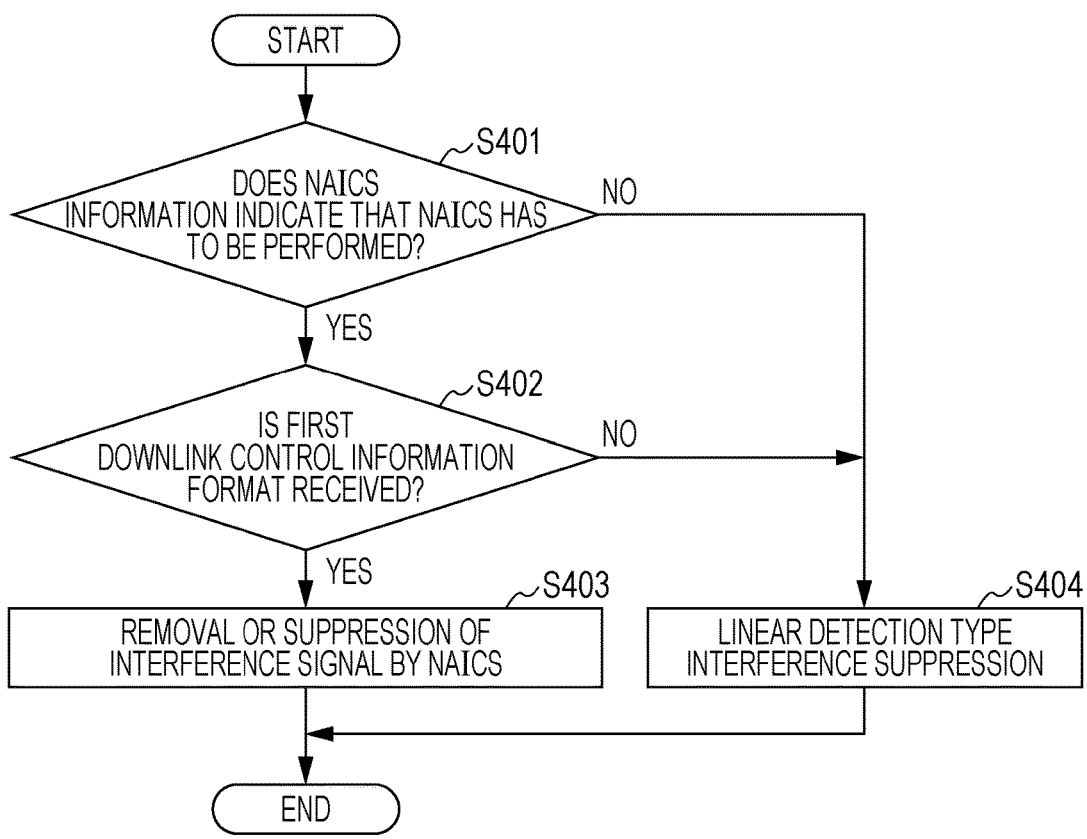
FIG. 4 is a flowchart illustrating an example of processing by the terminal apparatus according to the present embodiment.

FIG. 4 is a diagram illustrating a flow for reception processing by the terminal apparatus 2.

In S401, the higher layer processing unit 201 interprets the received NAICS information, and determines whether or not an indication that the NAICS has to be applied is present. In a case where the NAICS indication is present (YES in S401), proceeding to S402 takes place, and in a case where the NAICS is not present (NO in S401), proceeding to S404 takes place.

In S402, the control unit 202 determines whether the first downlink control information format or the second downlink control information format is received. In a case where the control unit 202 determines that the first downlink control information format is received (YES in S402), proceeding to S403 takes place. In a case where the control unit 202 determines that the first downlink control information format is not received (NO in S402), proceeding to S404 takes place.

In S403, the signal detection unit 2043 performs the cancellation/suppression of the interference signal in compliance with the NAICS.

In S404, the signal detection unit 2043 performs the suppression of the interference signal in complies with the linear scheme.

In this manner, the terminal apparatus according to the present invention includes the higher layer that determines whether or not to apply the NAICS, and the reception unit that receives the Downlink Control Information. Furthermore, in a case where, with the higher layer, the indication that the NAICS has to be applied is provided, if the first downlink control information format is received, the signal detection in compliance with the NAICS is performed. Alternatively, if the second downlink control information format is received, the signal detection in compliance with the linear scheme is performed.

By performing the processing as described above, the terminal apparatus can cancel/suppress the interference while reducing an amount of control information relating to a parameter indispensable to cancel/suppress the interference signal. Therefore, the terminal apparatus can reduce degradation in reception performance due to the interference in an efficient manner.

By performing the processing as described above, the terminal apparatus can cancel/suppress the interference while reducing the amount of control information relating to a parameter indispensable to cancel/suppress the interference signal. Therefore, the terminal apparatus can reduce degradation in reception performance due to the interference in an efficient manner.

A program running on the base station apparatus and the terminal apparatus according to the present invention is a program (a program for causing a computer to perform functions) that controls a CPU and the like in such a manner as to realize the functions according to the embodiments of the present invention, which are described above. Then, pieces of information that are handled in the apparatus and the apparatus are temporarily stored in a RAM while being processed. Thereafter, the pieces of information are stored in various ROMs or HDDs, and if need arises, is read by the CPU to be modified or written. As a recording medium on which to store the program, among a semiconductor medium (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the functions according to the embodiments described above are realized by executing the loaded program, and in addition, the functions according to the present invention are realized by performing processing in conjunction with an operating system or other application programs, based on an instruction from the program.

Furthermore, in a case where the programs are distributed on the market, the programs, each of which is stored on a portable recording medium, can be distributed, or can be transferred to a server computer that is connected through a network such as the Internet. In this case, a storage apparatus of the server computer is also included in the present invention. Furthermore, some or all of the portions of the terminal apparatus and the base station apparatus according to the embodiments, which are described above, may be realized as an LSI that is a typical integrated circuit. Each functional block of a reception apparatus may be individually built into a chip, and some or all the functional blocks may be integrated into a chip. In a case where each of the functional blocks is integrated into a circuit, an integrated circuit control module is added that controls the functional blocks.

Furthermore, a technique for the integrated circuit is not limited to the LSI, and an integrated circuit for the functional block may be realized as a dedicated circuit or a general-purpose processor. Furthermore, if with advances in semiconductor technology, a circuit integration technology for a circuit with which an LSI is replaced will appear, it is also possible to use an integrated circuit to which such a technology is applied.

Moreover, the invention in the present application is not limited to the embodiments described above. Furthermore, application of the terminal apparatus according to the invention in the present application is not limited to a mobile station apparatus. It goes without saying that the terminal apparatus can be applied to a stationary-type electronic apparatus that is installed indoors or outdoors, or a non-movable-type electronic apparatus, for example, an AV apparatus, a kitchen apparatus, a cleaning•washing machine, an air conditioner, office equipment, a vending machine, and other household apparatuses.

The embodiments of the present invention are described in detail above referring to the drawings, but specific configurations are not limited to the embodiments. A design and the like within a scope not departing from the gist of the present disclosure also fall within the scope of the claims.

INDUSTRIAL APPLICABILITY

The present invention is suitable for using a terminal apparatus, a base station apparatus, and an integrated circuit.

Moreover, the present international application claims the benefits of Japanese Patent Application No. 2014-057343 filed on Mar. 20, 2014, and the entire contents of Japanese Patent Application No. 2014-057343 are incorporated herein by reference.

REFERENCE SIGNS LIST 1A, 1B BASE STATION APPARATUS
2A, 2B, 2C TERMINAL APPARATUS
101 HIGHER LAYER PROCESSING UNIT
102 CONTROL UNIT
103 TRANSMISSION UNIT
104 RECEPTION UNIT
105 TRANSMIT AND RECEIVE ANTENNA
1011 RADIO RESOURCE CONTROL UNIT
1012 SCHEDULING UNIT
1013 NAICS INFORMATION GENERATION UNIT
1031 CODING UNIT
1032 MODULATION UNIT
1033 DOWNLINK REFERENCE SIGNAL GENERATION UNIT

1034 MULTIPLEXING UNIT
1035 WIRELESS TRANSMISSION UNIT
1041 WIRELESS RECEPTION UNIT
1042 DEMULTIPLEXING UNIT
1043 DEMODULATION UNIT
1044 DECODING UNIT
201 HIGHER LAYER PROCESSING UNIT
202 CONTROL UNIT
203 TRANSMISSION UNIT
204 RECEPTION UNIT
205 TRANSMIT AND RECEIVE ANTENNA
2011 RADIO RESOURCE CONTROL UNIT
2012 SCHEDULING INFORMATION INTERPRETATION UNIT
2013 NAICS INFORMATION INTERPRETATION UNIT
2031 CODING UNIT
2032 MODULATION UNIT
2033 UPLINK REFERENCE SIGNAL GENERATION UNIT
2034 MULTIPLEXING UNIT
2035 WIRELESS TRANSMISSION UNIT
2041 WIRELESS RECEPTION UNIT
2042 DEMULTIPLEXING UNIT
2043 SIGNAL DETECTION UNIT

The invention claimed is:

1. A terminal apparatus that communicates with a base station apparatus, the terminal apparatus comprising:
wireless reception circuitry that receives first information and second information from the base station apparatus; and
signal detection circuitry that cancels or suppresses interference from a different cell, wherein
in a case where a prescribed condition is satisfied, the signal detection circuitry cancels or suppresses interference from the different cell based on the first information,
the first information is information relating to a function of canceling or suppressing the interference from the different cell,
the second information is information relating to a transmission mode used for communication of the base station apparatus and the terminal apparatus, and
the prescribed condition includes the second information.

2. The terminal apparatus according to claim 1, wherein, in a case where the second information is a transmission mode relating to the downlink control information format 1, 1D, 2, 2A, 2B, 2C, or 2D, the signal detection circuitry cancels or suppresses the interference from the different cell based on the first information.

3. The terminal apparatus according to claim 1, wherein, in a case where the second information is information relating to a transmission mode 10, the signal detection circuitry suppresses the interference from the different cell in a linear scheme.

4. The terminal apparatus according to claim 1, wherein
in a case where the second information indicates information relating to a predetermined transmission mode, the signal detection circuitry cancels or suppresses the interference from the different cell based on the first information, and
in a case where the second information does not indicate information relating to the predetermined transmission mode, the signal detection circuitry suppresses the interference from the different cell in a linear scheme.

5. A communication method performed by a terminal apparatus that communicates with a base station apparatus, the communication method comprising:
a wireless reception step of receiving first information and second information from the base station apparatus; and
a signal detection step of canceling or suppressing interference from a different cell, wherein
in the signal detection step, in a case where a prescribed condition is satisfied, interference from the different cell is canceled or suppressed based on the first information,
the first information is information relating to a function of canceling or suppressing the interference from the different cell,
the second information is information relating to a transmission mode used for communication of the base station apparatus and the terminal apparatus, and
the prescribed condition includes the second information.

6. The communication method according to claim 5, wherein, in a case where the second information is a transmission mode relating to the downlink control information format 1, 1D, 2, 2A, 2B, 2C, or 2D, the interference from the different cell is canceled or suppressed based on the first information.

7. The communication method according to claim 5, wherein, in a case where the second information is information relating to a transmission mode 10, the interference from the different cell is suppressed in a linear scheme.

8. The communication method according to claim 5, wherein
in a case where the second information indicates information relating to a predetermined transmission mode, the interference from the different cell is canceled or suppressed based on the first information, and
in a case where the second information does not indicate information relating to the predetermined transmission mode, the interference from the different cell is suppressed in a linear scheme.

* * * * *